US012744294B2

(12) United States Patent
Mikase

(10) Patent No.: US 12,744,294 B2
(45) Date of Patent: Sep. 22, 2026

(54) FILTER DEVICE

(71) Applicant: Murata Manufacturing Co., Ltd., Nagaokakyo (JP)

(72) Inventor: Ryo Mikase, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 31 days.

(21) Appl. No.: 19/000,721

(22) Filed: Dec. 24, 2024

(65) Prior Publication Data

US 2025/0132481 A1 Apr. 24, 2025

Related U.S. Application Data

(63) Continuation of application No. PCT/JP2023/017730, filed on May 11, 2023.

(30) Foreign Application Priority Data

Jun. 28, 2022 (JP) ................................ 2022-103571

(51) Int. Cl.
*H01P 1/203* (2006.01)
*H01P 1/208* (2006.01)

(52) U.S. Cl.
CPC ........ *H01P 1/2084* (2013.01); *H01P 1/20327* (2013.01)

(58) Field of Classification Search
CPC .. H01P 1/20327; H01P 1/203; H01P 1/20336; H01P 1/20345; H01P 1/20354; H01P 1/20363; H01P 1/20372; H01P 1/20381; H01P 1/2039; H01P 1/205; H01P 1/209
USPC .......................................................... 333/204
See application file for complete search history.

(56) References Cited

U.S. PATENT DOCUMENTS

2001/0050599 A1* 12/2001 Maekawa ............. H01P 1/2135
333/204

FOREIGN PATENT DOCUMENTS

| | | | | |
|---|---|---|---|---|
| JP | S61258503 A | * 11/1986 | .......... H01P 1/20336 |
| JP | S62-30404 A | 2/1987 | |
| JP | S62-040801 A | 2/1987 | |
| JP | H03-101004 U1 | 10/1991 | |
| JP | 2002-171103 A | 6/2002 | |
| JP | 2004-349847 A | 12/2004 | |

(Continued)

OTHER PUBLICATIONS

International Search Report and Written Opinion mailed on Aug. 1, 2023, received for PCT Application PCT/JP2023/017730, filed on May 11, 2023, 9 pages including English Translation.

*Primary Examiner* — Stephen E. Jones
(74) *Attorney, Agent, or Firm* — XSENSUS LLP

(57) ABSTRACT

A filter device applied to a radio-frequency circuit includes a dielectric substrate on which a ground electrode is disposed and a main line which has an input end and an output end. The filter device also includes first and second resonators and an intermediate resonator. The main line is disposed to face the ground electrode and extends in a first direction. The first resonator intersects the main line and extends in a second direction. The second resonator intersects the main line and extends in the second direction in a region further to an output end side than the first resonator. At least part of the intermediate resonator is disposed between the first resonator and the second resonator.

19 Claims, 9 Drawing Sheets

(56) References Cited

FOREIGN PATENT DOCUMENTS

| | | | |
|---|---|---|---|
| JP | 2008-244706 | A | 10/2008 |
| JP | 2010-187220 | A | 8/2010 |

* cited by examiner

FILTER DEVICE

CROSS-REFERENCE TO RELATED APPLICATIONS

This application is a continuation of international application no. PCT/JP2023/017730, filed May 11, 2023, and which claims priority to Japanese application no. 2022-103571, filed Jun. 28, 2022. The entire contents of both prior applications are hereby incorporated by reference.

TECHNICAL FIELD

The present disclosure relates to a filter device, and more particularly, relates to a filter device applied to a radio-frequency circuit.

BACKGROUND ART

A conventional filter includes a plurality of resonator electrodes disposed close to a strip line. In this filter, each of the resonator electrodes is a so-called λ/4 resonator in which one of the ends is an open end and the other end is a short-circuited end (λ is a center wavelength in a band). Each of the resonator electrodes extends in a direction perpendicular to a strip line while the open end faces the strip line. With such a structure, the filter functions as a band-stop filter generating an attenuation pole in the center frequency.

SUMMARY

Technical Problem

The band-stop filter as described above is used for applications for which steep attenuation characteristics are necessary near a specific pass band. When increasing of the band width of a pass band or ensuring of isolation of signals between adjacent pass bands is wanted, use of such a band-stop filter achieves desired characteristics. For example, in a so-called dual band-type antenna configured to radiate radio-frequency signals of two different frequency bands, the band-stop filter can be used in a case where the band-stop filter is disposed in a transport path through which a signal in one of the frequency bands is conveyed so as to attenuate a signal in the other frequency band.

The antenna as described above may be used for small-seized mobile terminals such as smartphones. Due to segmentation of frequency bands used for transmission and reception, band widths of two frequency bands can be close to each other. In this case, the stop band of the band-stop filter for attenuating the signal of one of the frequency bands may be superposed on the pass band of the signal of the other frequency band. This may lead to degradation of the antenna characteristics. Accordingly, a filter device having steeper attenuation characteristics of attenuation in a narrower band width is desired.

In the structure of the conventional filter described above, in order to make steeper attenuation characteristics of attenuation in a narrower band, it is necessary to increase the number of stages of resonator electrodes. However, as the number of resonator electrodes increases, a substrate area necessary for a formation of a circuit increases. Thus, a device size of the entire antenna may increase.

The present disclosure has been made to solve such problems, and exemplary objects of the present disclosure are to improve filter characteristics and achieve size reduction in a filter device (band-stop filter) applied to a radio-frequency circuit.

Solution to Problem

A filter device according to the present disclosure is applied to a radio-frequency circuit. The filter device includes a dielectric substrate on which a first ground electrode is disposed and a main line which has an input end and an output end. The filter device also includes a first resonator, a second resonator, and an intermediate resonator. The main line is disposed so as to face the first ground electrode and extends in a first direction. The first resonator intersects the main line and extends in a second direction. The second resonator intersects the main line and extends in the second direction in a region further to an output end side than the first resonator. At least part of the intermediate resonator is disposed between the first resonator and the second resonator.

Advantageous Effects

The filter device according to the present disclosure has a structure in which the intermediate resonator is disposed between two resonators intersecting the main line. In such resonators in the structure of at least three stages, cross-coupling is generated between a resonator at a first stage and a resonator at a last stage with the main line and/or the intermediate resonator. Since a new pole is generated due to the cross-coupling, an attenuation amount in the stop band can be ensured with a small number of stages of resonators compared to a filter device structured not generating cross-coupling. Accordingly, the filter characteristics can be improved and the size reduction can be achieved.

DETAILED DESCRIPTION

Figure 1:
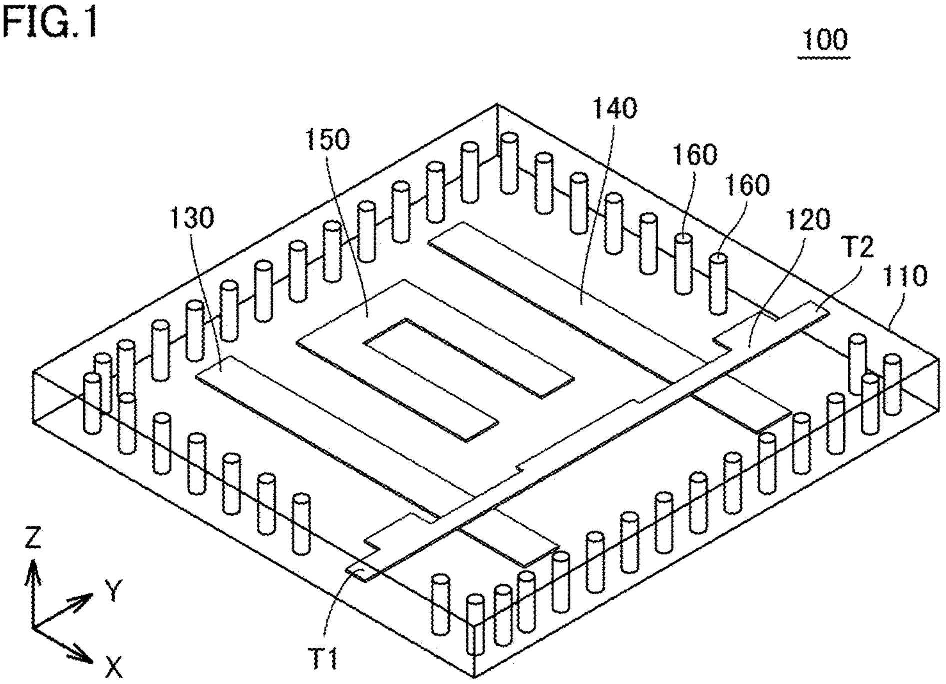
FIG. 1 is a perspective view illustrating the inside of a filter device according to exemplary Embodiment 1.

Hereinafter, exemplary embodiments of the present disclosure will be described in detail with reference to the drawings. The same or corresponding elements in the drawings are denoted by the same reference numerals, and repeated description thereof will be omitted.

Embodiment 1

Figure 2:
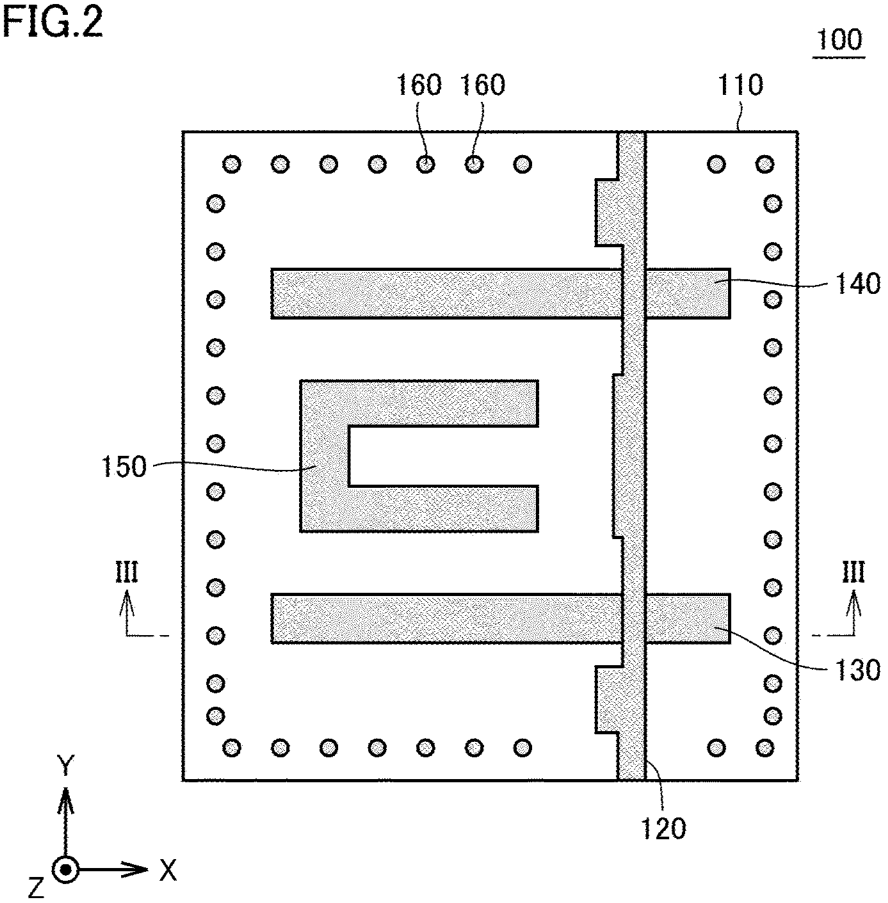
FIG. 2 is a plan view of the filter device illustrated in FIG. 1.
Figure 3:
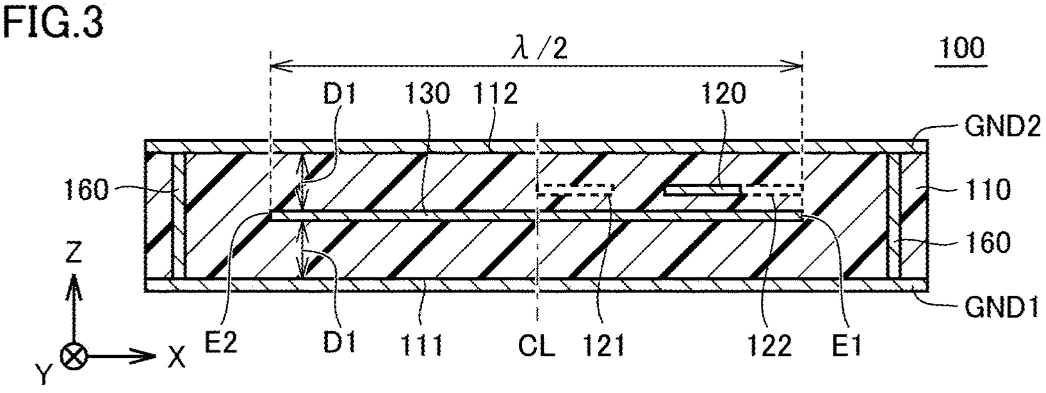
FIG. 3 is a sectional view taken along line III-III illustrated in FIG. 2.

With reference to FIGS. 1 to 3, a structure of a filter device 100 according to exemplary Embodiment 1 is described. FIG. 1 is a perspective view illustrating the inside of the filter device 100. FIG. 2 is a plan view of the filter device 100. FIG. 3 is a sectional view taken along line III-III illustrated in FIG. 2.

With reference to FIGS. 1 to 3, the filter device 100 includes a flat-shaped dielectric substrate 110, a main line 120, resonators 130 to 150, via conductors 160, and ground electrodes GND1 and GND2. The dielectric substrate 110 has a main surface having a rectangular shape in plan view when viewed from a Z-axis direction. A direction of one of the sides adjacent to the main surface is defined as an X-axis direction, a direction along the other side is defined as a Y-axis direction, and a normal direction to the main surface is defined as the Z-axis direction. In the following description, the positive direction of the Z-axis direction may be referred to as an upper side, and the negative direction of the Z-axis direction may be referred to as a lower side. Referring to FIGS. 1 and 2, a dielectric of the dielectric substrate 110 is omitted so that the inside structure of the dielectric substrate 110 can be seen.

The filter device 100 according to exemplary Embodiment 1 is a so-called band-stop filter (or a notch filter) for attenuating a predetermined frequency component in a radio-frequency signal conveyed through the main line 120.

The dielectric substrate 110 is, for example, one of the following substrates: a low temperature co-fired ceramics (LTCC) laminated substrate: a laminated resin substrate formed by laminating a plurality of resin layers composed of resin such as epoxy or polyimide: a laminated resin substrate formed by laminating a plurality of resin layers composed of a liquid crystal polymer (LCP) having a lower permittivity: a laminated resin substrate formed by laminating a plurality of resin layers composed of fluorine resin: a laminated resin substrate formed by laminating a plurality of resin layers composed of a polyethylene terephthalate (PET) material: and a laminated ceramic substrate other than LTCC. The dielectric substrate 110 does not necessarily have a laminated structure but may be a single layer substrate.

The flat-shaped ground electrode GND1 is disposed on the entirety of a lower surface 111 of the dielectric substrate 110 or a layer of the dielectric substrate 110 close to the lower surface 111. Likewise, the flat-shaped ground electrode GND2 is disposed on the entirety of an upper surface 112 of the dielectric substrate 110 or a layer of the dielectric substrate 110 close to the upper surface 112. The ground electrode GND2 is not a necessary element. It is sufficient that at least the ground electrode GND1 be disposed.

The ground electrode GND1 and the ground electrode GND2 are connected to each other through a plurality of the via conductors 160 extending in the Z-axis direction of the dielectric substrate 110. The via conductors 160 are disposed along the periphery of the main surface of the rectangular shape in plan view when the dielectric substrate 110 is viewed from the Z-axis direction. The plurality of via conductors 160 function as a shield for reducing the influence of an external electromagnetic field.

The main line 120 extends along a Y axis at a position offset from the center of the dielectric substrate 110 in the positive direction of an X axis. The main line 120 is a flat electrode having a substantially strip shape. In the dielectric substrate 110, the main line 120 is disposed between the ground electrode GND1 and the ground electrode GND2. That is, the main line 120 is a strip line. In the main line 120, the signal is conveyed from an input end T1 at an end portion in a negative direction of the Y axis to an output end T2 at an end portion in a positive direction of the Y axis.

The resonators 130 and 140 are strip-shaped flat electrodes extending along the X axis. In each of the resonators 130 and 140, both an end portion E1 (first end portion) in the positive direction of the X axis and an end portion E2 (second end portion) in a negative direction of the X axis are open ends. In the dielectric substrate 110, the resonators 130 and 140 are disposed at respective positions separated from the ground electrode GND1 and the ground electrode GND2 by an equidistance D1. The resonators 130 and 140 are configured to operate as distributed constant-type resonators due to an inductance component of the electrodes and a capacitance component between the ground electrodes GND1 and GND2. When the wavelength in the dielectric substrate 110 corresponding to the center frequency in the frequency band to be attenuated is $\lambda$, the length of the resonators 130 and 140 in the X-axis direction is set to $\lambda/2$.

The resonators 130 and 140 are disposed at positions separated from each other in the Y-axis direction by a predetermined distance. More specifically, the resonator 130 is disposed at a position offset from the center of the dielectric substrate 110 in the negative direction of the Y axis, and the resonator 140 is disposed at a position offset from the center of the dielectric substrate 110 in the positive direction of the Y axis. In other words, the resonator 140 is disposed further to the output end T2 of the main line 120 side than the resonator 130. A spacing between the resonator 130 and the resonator 140 is set to about $\lambda/4$ to $\lambda/2$.

In plan view from the normal direction of the dielectric substrate 110, the resonators 130 and 140 intersect the main line 120. As illustrated in FIG. 3, the main line 120 is disposed at a position that is between the centers (a virtual line CL) of the resonators 130 and 140 in the X-axis direction and the end portions E1 in the X-axis direction and that is separated from each resonator in the positive direction of the Z-axis. More specifically, the main line 120 is disposed at a position between a position (broken line 121) where an end portion of the main line 120 in the negative direction of the X axis is superposed on the virtual line CL and a position (broken line 122) where an end portion of the main line 120 in the positive direction of the X axis is superposed on the end portions E1 of the resonators 130 and 140.

When the main line 120 is superposed on the resonators 130 and 140 as described above, the main line 120 and each of the resonators 130 and 140 are capacitively coupled to each other. As a result, the resonator 130 and the resonator 140 are coupled to each other with the main line 120 interposed therebetween. As the distance between the position of the main line 120 and the centers (that is, the broken line 121) of the resonators 130 and 140 reduces, the coupling is weakened, and as the distance between the position of the main line 120 and the end portions E1 (that is, the broken line 122) reduces, the coupling is strengthened.

For reducing loss of the radio-frequency signal to be conveyed as much as possible, the impedance is preferably equalized throughout the main line 120 from the input end T1 to the output end T2. In portions intersecting the resonators 130 and 140, the capacitance component increases due to electrodes of the resonators 130 and 140. Thus, regions having a line width greater than the line width of the main line 120 in the intersections are provided in portions of the main line 120 intersecting neither the resonator 130 nor the resonator 140. When the line width is increased as described above, the capacitance component between the ground electrodes GND1 and GND2 can be increased. This can suppress impedance variation throughout the main line 120, and accordingly, pass loss due to impedance mismatching can be reduced.

The resonator 150 is a strip-shaped flat electrode having a substantially U shape and disposed between the resonator 130 and the resonator 140 so as to be separated from the resonator 130 and the resonator 140. Furthermore, the resonator 150 is disposed at a position separated from the ground electrode GND1 and the ground electrode GND2 by the equidistance D1. That is, the resonator 150 is disposed in the same layer as the layer of the resonators 130 and 140 in the dielectric substrate 110. Both end portions of the resonator 150 are open ends directed toward the positive direction of the X axis. In other words, the open ends of the resonator 150 are directed toward the main line 120. Furthermore, the resonator 150 is disposed further to the end portions E2 of the resonators 130 and 140 side than the main line 120. A line length of the resonator 150 from one of the open ends to the other open end is set to λ/2.

As has been described, in the filter device 100, the line length of each of the resonators 130 to 150 is set to λ/2. Thus, the individual resonators operate as λ/2 resonators having the same resonant frequency. Thus, the resonator 130 and the resonator 150 are coupled to each other, and the resonator 150 and the resonator 140 are coupled to each other. This results in coupling of the resonator 130 and the resonator 140 to each other.

In the filter device 100, out of radio-frequency signals received at the input end T1 of the main line 120, signals corresponding to the resonant frequency of the resonators are absorbed by a resonant circuit formed by the resonators 130 to 150. Thus, signals from which the signals corresponding to the resonant frequency have been removed are output from the output end T2. That is, the filter device 100 functions as a band-stop filter for removing the signals corresponding to the resonant frequency of the resonators 130 to 150.

Here, in the filter device 100, cross-coupling between the resonator 130 and the resonator 140 occurs with the resonator 150 and the main line 120 interposed therebetween. When the cross-coupling occurs, an additional attenuation pole is further formed in the resonant frequency of the resonators. Thus, an attenuation amount of signals in a corresponding frequency band can be increased.

Figure 4:
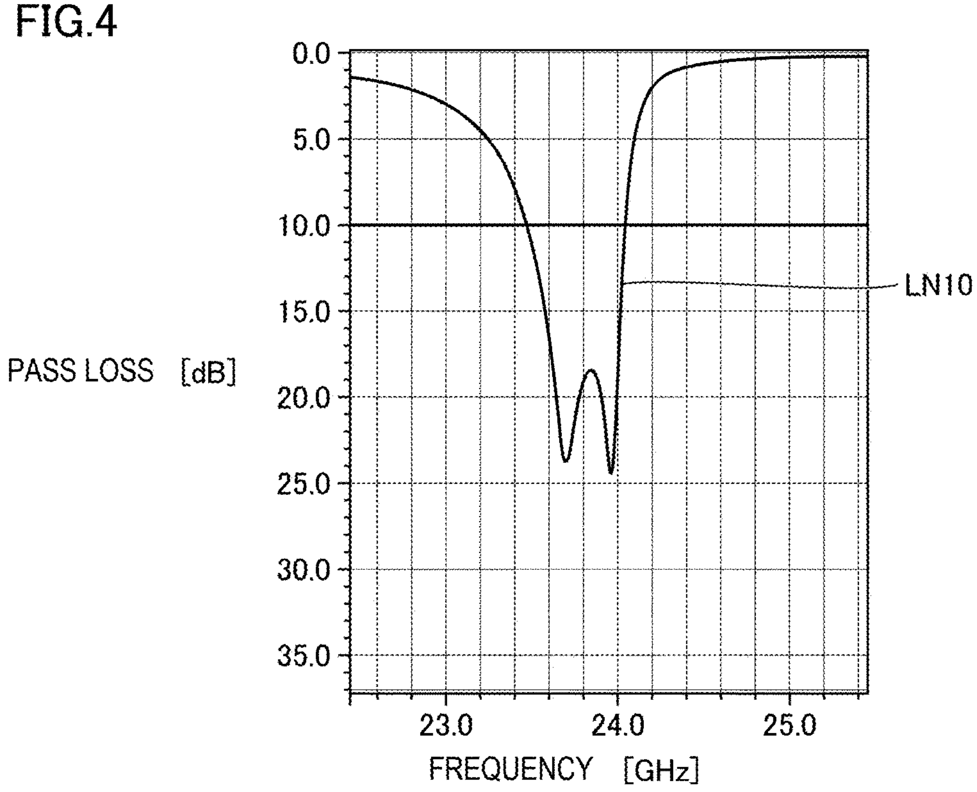
FIG. 4 is a diagram illustrating bandpass characteristics of the filter device illustrated in FIG. 1.

FIG. 4 is a diagram illustrating bandpass characteristics of the filter device 100 illustrated in FIG. 1. Referring to FIG. 4, the horizontal axis represents the frequency, and the vertical axis represents the pass loss of the filter device 100. As illustrated in FIG. 4, with the filter device 100, a frequency band where the attenuation amount is greater than or equal to 10 dB is 23.5 to 24.2 GHz. Thus, high attenuation characteristics are obtained in a comparatively narrow band.

As has been described, the filter device 100 can increase the attenuation amount in a desired frequency band with a comparatively small number of resonators due to utilization of the cross-coupling between the resonator 130 on the input end T1 side and the resonator on the output end T2 side. Accordingly, the filter characteristics can be improved, and the size reduction of the filter device can be achieved.

The attenuation amount by the resonant circuit formed by the resonators 130 to 150 is influenced by coupling amounts between the main line 120 and the resonator 130 and between the main line 120 and the resonator 140 and/or a coupling amount of the cross-coupling between the resonators 130 and 140. As described above, the coupling amounts between the main line 120 and the resonator 130 and between the main line 120 and the resonator 140 vary depending on the positions where the resonators 130 and 140 and the main line 120 intersect each other. Furthermore, the coupling amount of the cross-coupling between the resonators 130 and 140 also varies depending on the distance between the resonators 130 and 140. Thus, the position of the main line 120 in the X-axis direction and/or the Z-axis direction and the distance between the resonator 130 and the resonator 140 are appropriately adjusted corresponding to a desired attenuation amount.

Furthermore, depending on the length of a portion of the resonator 150 along the X-axis direction, that is, the length of the portion facing the resonators 130 and 140, the coupling amount between the resonator 150 and the resonator 130 and the coupling amount between the resonator 150 and the resonator 140 vary, and these coupling amount can also influence the attenuation amount by the resonant circuit. Accordingly, the attenuation amount can also be adjusted by adjusting the shape of the resonator 150.

The "resonator 130" and the "resonator 140" according to exemplary Embodiment 1 respectively correspond to a "first resonator" and a "second resonator" according to the present disclosure. The "resonator 150" according to exemplary Embodiment 1 corresponds to an "intermediate resonator" according to the present disclosure. The "ground electrode GND1" and the "ground electrode GND2" according to exemplary Embodiment 1 respectively correspond to a "first ground electrode" and a "second ground electrode" according to the present disclosure.

Embodiment 2

In exemplary Embodiment 2, a structure in which the disposition of the intermediate resonator is different from that of exemplary Embodiment 1 is described.

Figure 5:
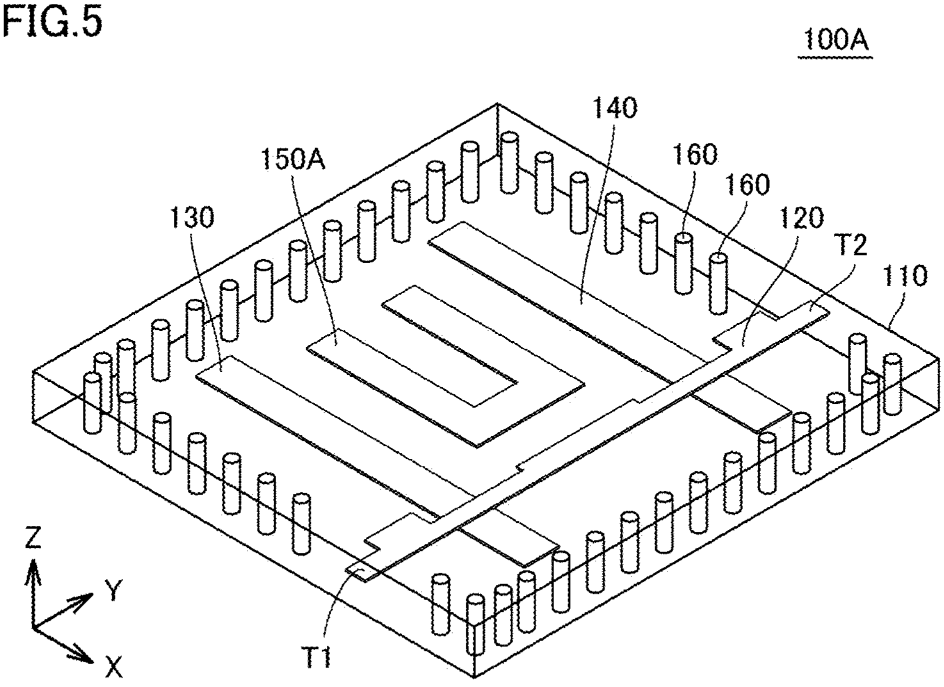
FIG. 5 is a perspective view illustrating the inside of a filter device according to exemplary Embodiment 2.

FIG. 5 is a perspective view illustrating the inside of a filter device 100A according to exemplary Embodiment 2. Referring to FIG. 5, the resonator 150 in the filter device 100 according to exemplary Embodiment 1 is replaced with a resonator 150A. The structure in FIG. 5 other than the above description is the same as or similar to that of the filter device 100, and the description of the common elements is not repeated.

Although the resonator 150A includes a substantially U-shaped flat electrode in the same manner as or similarly to the resonator 150 of the filter device 100, the resonator 150A is opposite in direction to the resonator 150 in the dielectric substrate 110. Specifically, end portions of the electrode in the resonator 150A are directed in the negative direction of the X axis, that is, toward the end portions E2 of the resonators 130 and 140.

Here, the coupling amount between the resonators is influenced by the difference in wavelength. Thus, the coupling amount between the resonators can vary depending on the positional relationships between the end portions of the resonator 150A and the end portions E2 of the resonators 130 and 140. Specifically, as the difference in the X-axis direction between the positions of the end portions of the resonator 150A and the positions of the end portions E2 of the resonators 130 and 140 reduces, the coupling amount between the resonators becomes weak. Accordingly, in the filter device 100A, the coupling amounts between the resonator 150A serving as the intermediate resonator and the resonator 130 and between the resonator 150A and the resonator 140 become weak compared to those of the filter device 100 of exemplary Embodiment 1.

When the coupling amounts between the intermediate resonator and the resonator 130 and between the intermediate resonator and the resonator 140 become excessively strong, stored energy of the resonators in the stop band increases. Thus, the band width of the stop band can increase, and loss in the pass band can increase. Accordingly, when the coupling amounts between the resonator 150A and the resonator 130 and between the resonator 150A and the resonator 140 are weakened by disposing the resonator 150A serving as the intermediate resonator as illustrated in FIG. 5, the band width of the stop band can be further reduced, and the loss in the pass band can be reduced.

Figure 6:
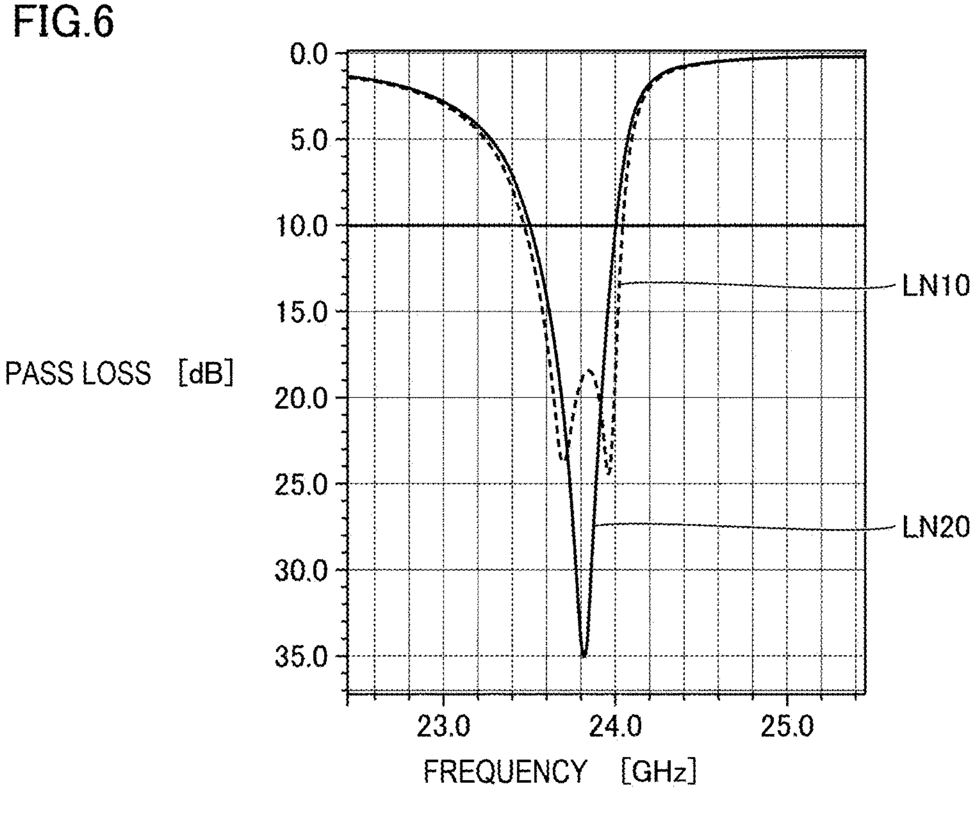
FIG. 6 is a diagram illustrating bandpass characteristics of the filter device illustrated in FIG. 5.

FIG. 6 is a diagram illustrating the bandpass characteristics of the filter device 100A (a solid line LN20) illustrated in FIG. 5. Referring to FIG. 6, the bandpass characteristics of the filter device 100 according to exemplary Embodiment 1 is indicated by a broken line LN10 for comparison. As illustrated in FIG. 6, in the filter device 100A, a frequency band where the attenuation amount is greater than or equal to 10 dB is 23.55 to 24.0 GHz. Thus, the band width of the stop band is narrower than that of the filter device 100 according to exemplary Embodiment 1. Furthermore, the attenuation amount in the stop band increases, and steep attenuation characteristics are obtained at end portions of the pass band further to the low-frequency side and the high-frequency side than the stop band.

As has been described, when the coupling amount between the resonators is weakened by changing the disposition of the intermediate resonator, the filter characteristics can be further improved, and the size reduction can be achieved.

Embodiment 3

Figure 7:
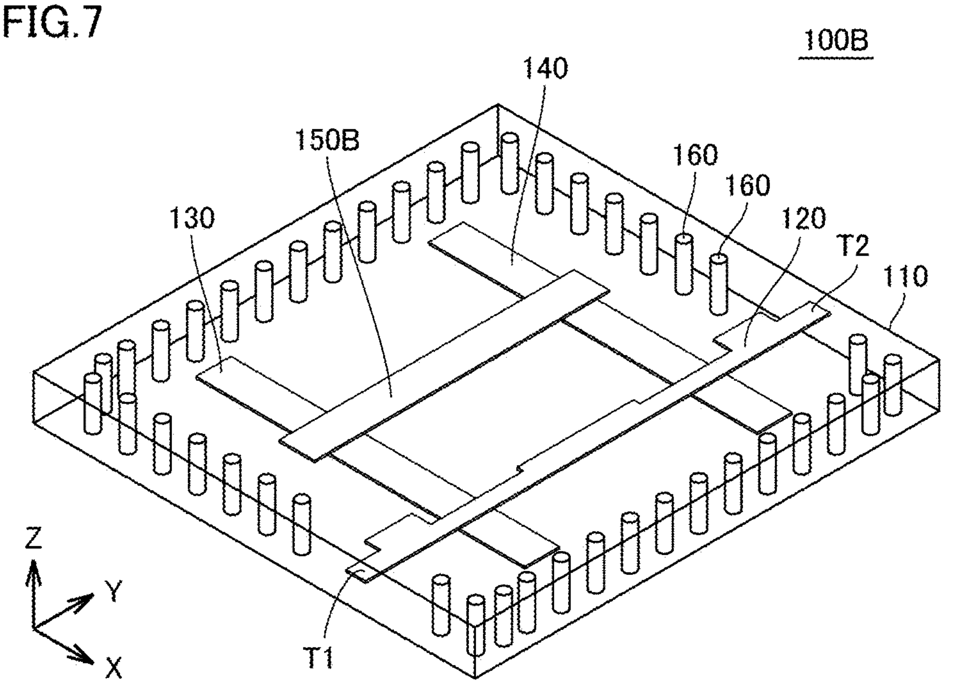
FIG. 7 is a perspective view illustrating the inside of a filter device according to exemplary Embodiment 3.
Figure 8:
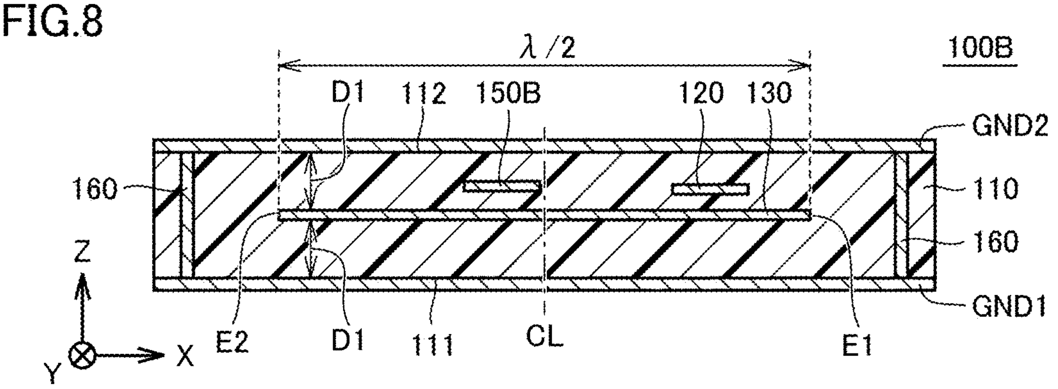
FIG. 8 is a sectional view of the filter device illustrated in FIG. 7.

In exemplary Embodiment 3, a structure of another disposition of the intermediate resonator is described. FIG. 7 is a perspective view illustrating the inside of a filter device 100B according to exemplary Embodiment 3. FIG. 8 is a sectional view of the filter device 100B illustrated in FIG. 7. In the filter device 100B, the resonator 150 serving as the intermediate resonator in the filter device 100 according to exemplary Embodiment 1 is replaced with a resonator 150B. The structure in FIG. 7 other than the above description is the same as or similar to that of the filter device 100, and the description of the common elements is not repeated.

Referring to FIGS. 7 and 8, the resonator 150B is a strip-shaped flat electrode extending along the Y-axis direction and disposed in a layer between the layer where the resonators 130 and 140 are disposed and the ground electrode GND2 in the dielectric substrate 110. The line length of the resonator 150B in the Y-axis direction is λ/2. The resonator 150B intersects the resonator 130 and the resonator 140 and is capacitively coupled to the resonator 130 and the resonator 140 at the intersections. That is, in plan view of the dielectric substrate 110, part of the resonator 150B is disposed between the resonator 130 and the resonator 140. As illustrated in FIG. 8, the position of the resonator 150B in the X-axis direction is disposed between the centers and the end portions E2 of the resonators 130 and 140 in the X-axis direction.

The magnitude of the electric fields generated in the resonators 130 and 140 varies depending on positions in the X-axis direction and increases toward the end portions. Accordingly, the coupling amounts between the resonator 150B and the resonator 130 and between the resonator 150B and the resonator 140 vary depending on the position of the resonator 150B in the X-axis direction. Specifically, in the X-axis direction, the coupling amounts are substantially equal to zero near or at the centers of the resonators 130 and 140, and the coupling amounts increase toward the end portions. As has been described, when the coupling amounts between the resonator 150B and the resonator 130 and between the resonator 150B and the resonator 140 increase, the loss in the pass band is likely to reduce. Since one of the objects is to reduce the band width of the stop band, the resonator 150B is disposed at positions close to the centers of the resonators 130 and 140 in the X-axis direction in the filter device 100B.

Figure 9:
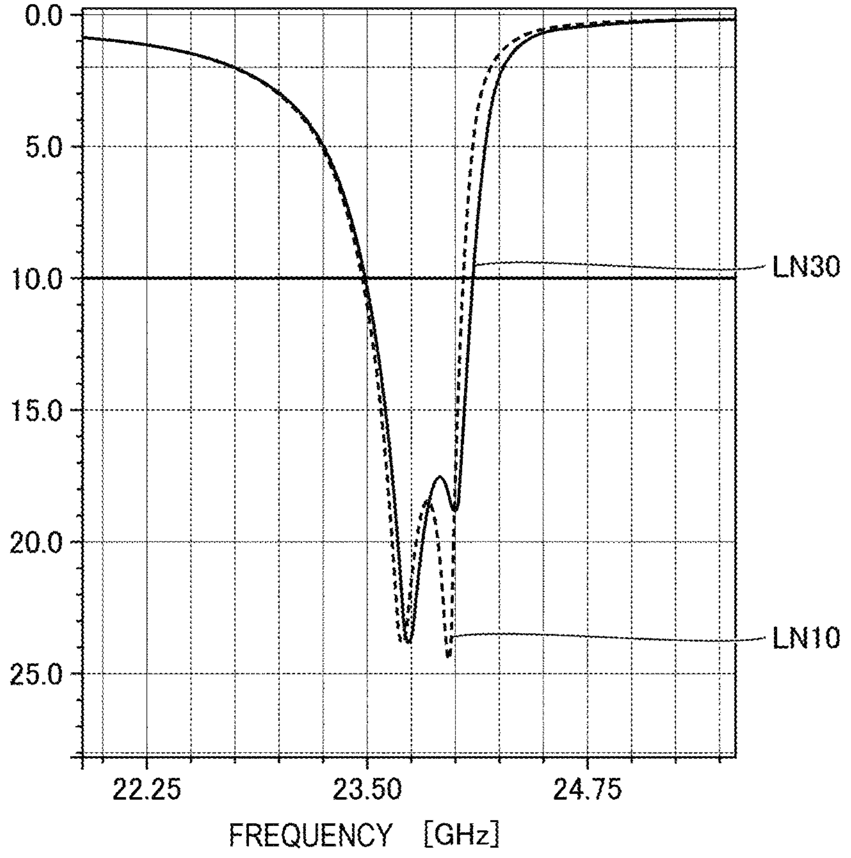
FIG. 9 is a diagram illustrating bandpass characteristics of the filter device illustrated in FIG. 7.

FIG. 9 is a diagram illustrating the bandpass characteristics of the filter device 100B illustrated in FIG. 7. When the resonator 150B is capacitively coupled to the resonators 130 and 140 as is the case with the filter device 100B, the coupling amounts with the resonators 130 and 140 are likely to increase compared to those of the resonator 150 according to exemplary Embodiment 1. However, with the filter device 100B, when the position of the resonator 150B in the X-axis direction and a separation distance from the resonators 130 and 140 in the Z-axis direction are adjusted, attenuation characteristics substantially the same degree as that of the filter device 100 according to exemplary Embodiment 1 can be obtained.

Figure 10:
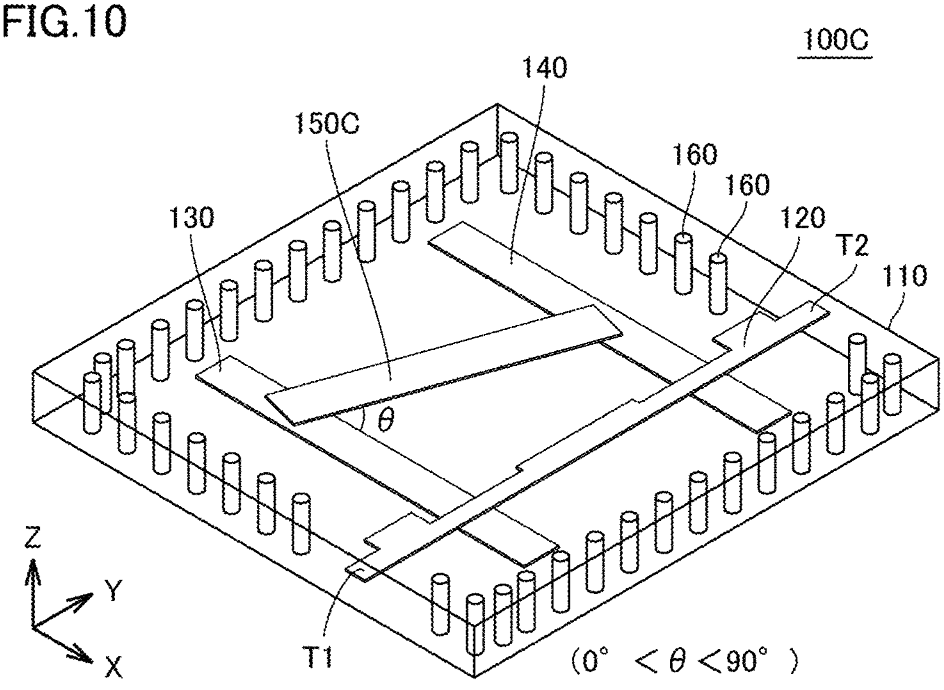
FIG. 10 is a perspective view illustrating the inside of a filter device according to Modification 1.

In the example of the filter device 100B, the resonator 150B is disposed so as to be perpendicular to the resonators 130 and 140. However, as is the case with a filter device 100C according to Modification 1 illustrated in FIG. 10, an angle θ formed between a resonator 150C and the resonators 130 and 140 may be 0°<θ90° as long as the resonator 150C and the resonators 130 and 140 intersect each other.

Embodiment 4

In exemplary Embodiment 4, a structure for further reducing the size of the filter device is described.

Figure 11:
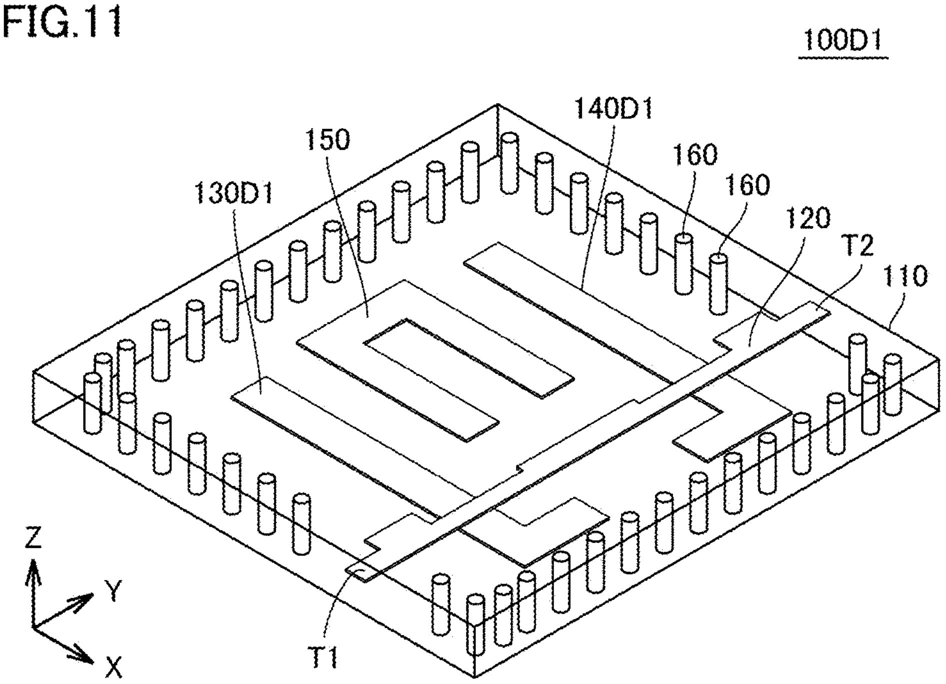
FIG. 11 is a perspective view illustrating the inside of a filter device according to exemplary Embodiment 4.

FIG. 11 is a perspective view illustrating the inside of a filter device 100D1 according to exemplary Embodiment 4. In the filter device 100D1, the resonators 130 and 140 of the filter device 100 according to exemplary Embodiment 1 are replaced with resonators 130D1 and 140D1. The structure in FIG. 10 other than the above description is the same as or similar to that of the filter device 100, and the description of the common elements is not repeated.

Referring to FIG. 11, the resonators 130D1 and 140D1 in the filter device 100D1 each have a substantially L shape in which an end portion in the positive direction of the X axis (that is, the end portion E1 in the filter device 100) is bent in the Y-axis direction. More specifically, the end portion E1 of the resonator 130D1 is bent in the positive direction of the Y axis, that is, toward the resonator 140D1. The end portion E1 of the resonator 140D1 is bent in the negative direction of the Y axis, that is, toward the resonator 130D1.

When the end portions of the resonators 130D1 and 140D1 are bent as described above, the dimension of the filter device 100D1 in the X-axis direction can be reduced compared to that of the filter device 100 according to exemplary Embodiment 1. Thus, when the coupling amount between the resonators 130D1 and 140D1 having been bent does not change, the size of the device can be reduced while the bandpass characteristics equivalent to those of the filter device 100 is maintained.

Figure 12:
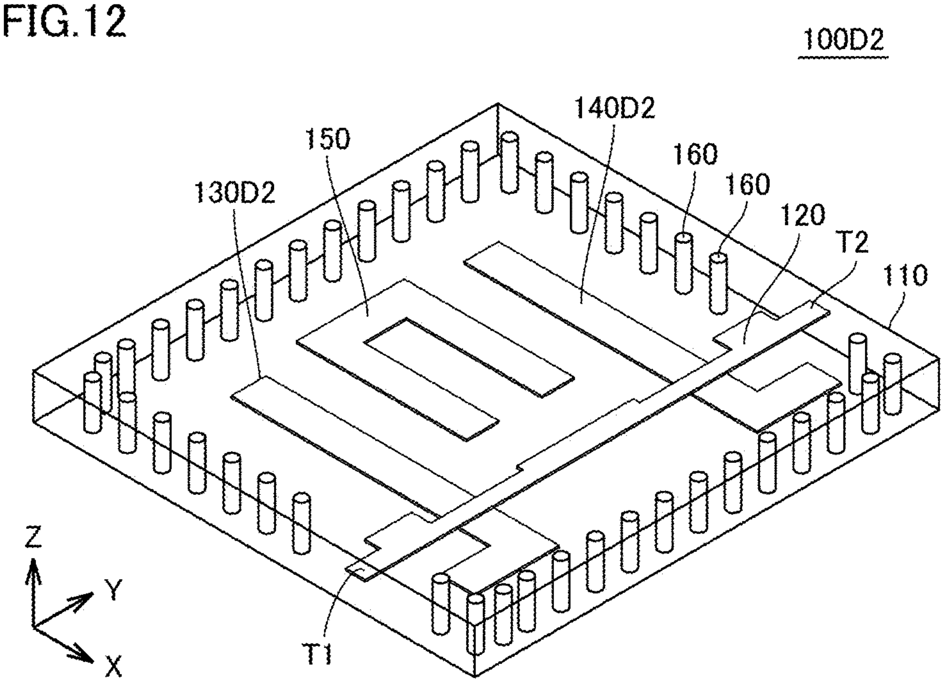
FIG. 12 is a perspective view illustrating the inside of a filter device according to Modification 2.

When the coupling amount between the resonators 130D1 and 140D1 is increased by bending the end portions of the resonators 130D1 and 140D1 so as to face each other as is the case with the filter device 100D1, the end portions may be bent to mutually opposite sides as is the case with resonators 130D2 and 140D2 of a filter device 100D2 according to Modification 2 illustrated in FIG. 12 to suppress the increase in coupling amount. Alternatively, although it is not illustrated, the end portions of two resonators may be bent in the same direction, for example, in the positive direction or the negative direction of the Y axis.

As has been described, when the end portions of the resonators on the input end side and the output end side are bent, the size of the filter device can be further reduced.

Embodiment 5

According to the above-described exemplary embodiments, the resonators on the input end side and the output end sides are λ/2 resonators. According to exemplary Embodiment 5, the resonators on the input end side and the output end side are λ/4 resonators.

Figure 13:
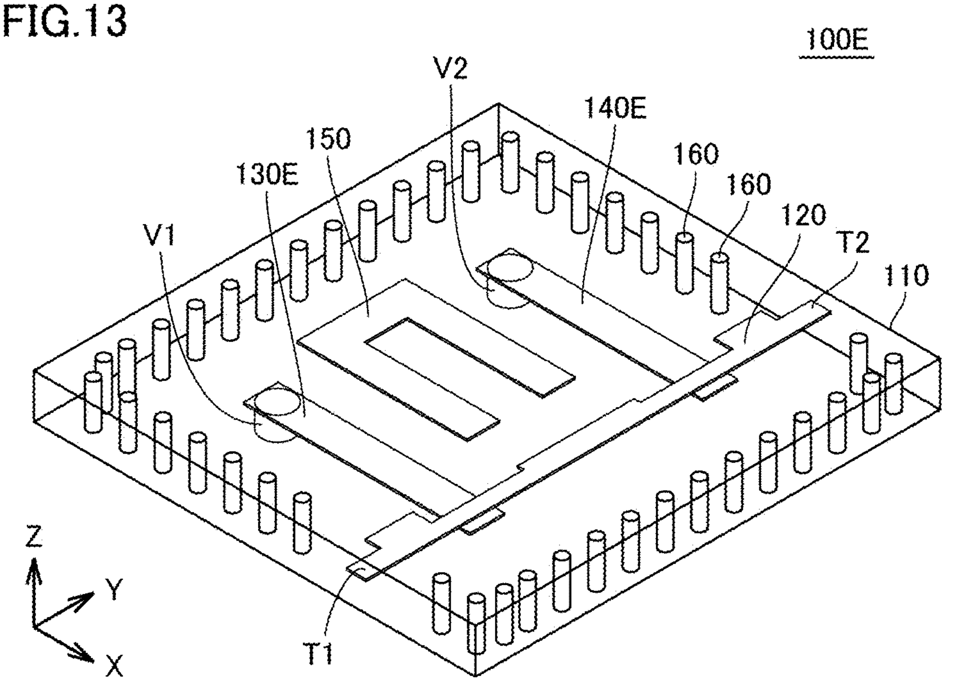
FIG. 13 is a perspective view illustrating the inside of a filter device according to exemplary Embodiment 5.
Figure 14:
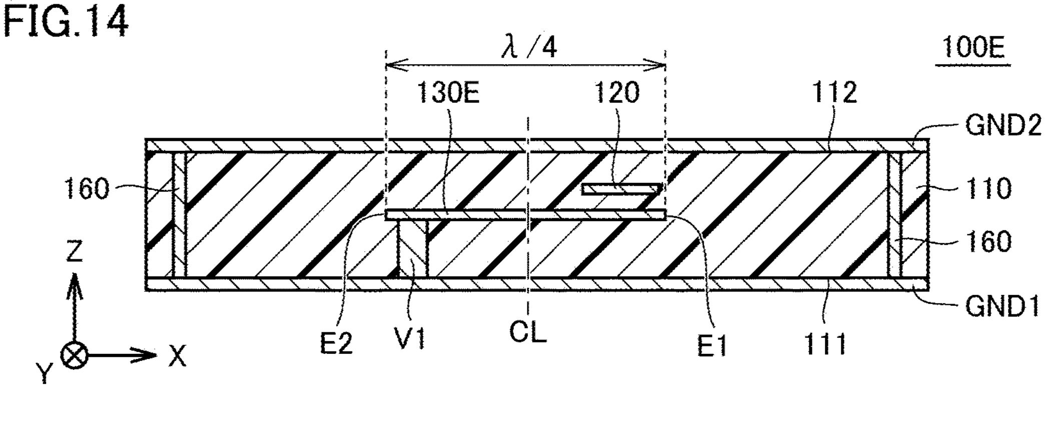
FIG. 14 is a sectional view of the filter device illustrated in FIG. 13.

FIG. 13 is a perspective view illustrating the inside of a filter device 100E according to exemplary Embodiment 5. FIG. 14 is a sectional view of the filter device 100E.

Referring to FIGS. 13 and 14, resonators 130E and 140E are provided in the filter device 100E. Each of the resonators 130E and 140E is a flat electrode that extends along the X-axis direction and has a line length of λ/4. The resonators 130E and 140E are connected to the ground electrode GND1 respectively through vias V1 and V2 on the end portion E2 side in the negative direction of the X axis. The end portion E1 of each of the resonators 130E and 140E in the positive direction of the X axis is an open end. The resonators 130E and 140E each intersect the main line 120 between the center thereof in the X-axis direction and the end portion E1.

The resonator 150 serving as the intermediate resonator is a λ/2 resonator having a substantially U shape as is the case with the filter device 100 according to exemplary Embodiment 1.

Also in such a structure, basically, the filter characteristics the same as or similar to those of the filter device 100 can be achieved. Since the resonators on the input end side and the output end side are λ/4 resonators, the dimension of the filter device in the X-axis direction can be further reduced.

Embodiment 6

In exemplary Embodiment 6, the size of the filter device is reduced by changing the line width of parts of the resonators on the input end side and the output end side.

Figure 15:
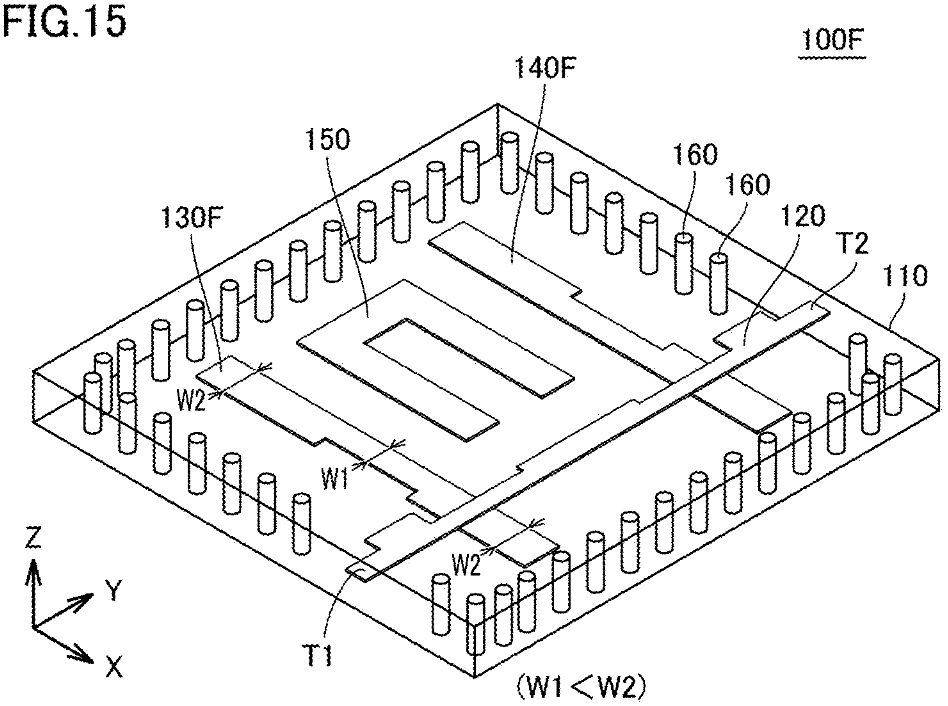
FIG. 15 is a perspective view illustrating the inside of a filter device according to exemplary Embodiment 6.

FIG. 15 is a perspective view illustrating the inside of a filter device 100F according to exemplary Embodiment 6. In the filter device 100F, the resonators 130 and 140 of the filter device 100 according to exemplary Embodiment 1 are replaced with resonators 130F and 140F. The structure in FIG. 15 other than the above description is the same as or similar to that of the filter device 100, and the description of the common elements is not repeated.

Referring to FIG. 15, the resonators 130F and 140F in the filter device 100F each have a shape in which the line width at end portions in the X-axis direction is greater than the line width near or at the center. Specifically, the line width of the resonators 130F and 140F is W1 near or at the centers and W2 (W1<W2) near or at the end portions E1 and E2.

In the case of linear flat electrodes such as the resonators 130F and 140F, generally, the magnetic field becomes zero near or at the center and becomes the maximum at end portions in the extending direction. That is, influence on the capacitance component tends to become large on the end portion sides of the electrode, and influence on the inductance component tends to become large near or at the center of the electrode. Accordingly, when the line width is increased on the end portion sides, the capacitance component is further increased. When the line width is reduced near the center, the inductance component is further increased.

A resonant frequency f of a resonator is expressed as $f=\frac{1}{2}\cdot(LC)^{-\frac{1}{2}}$. Accordingly, when the line width is increased at the end portions and reduced near or at the center as in the resonators 130F and 140F, the same resonant frequency can be obtained with a smaller line width. That is, the line length of the resonators 130F and 140F in the filter device 100F is smaller than the line length of the resonators 130 and 140 in the filter device 100. Thus, size reduction can be achieved by reducing the dimension of the filter device in the X-axis direction.

In the filter device 100F, the line width of each of the resonators 130F and 140F is larger at the end portions than at the centers or the portions near the centers. However, the line width may be increased at only one of the end portions. Also, the dimensions of the portions in the X-axis direction where the line width is increased can be appropriately changed depending on desired filter characteristics and the size.

Embodiment 7

In the examples according to the exemplary embodiments and modifications described above, the intermediate resonator includes a single resonator. However, the intermediate resonator may include two or more resonators as long as the resonator on the input end side and the resonator on the output end side can be cross coupled to each other.

Figure 16:
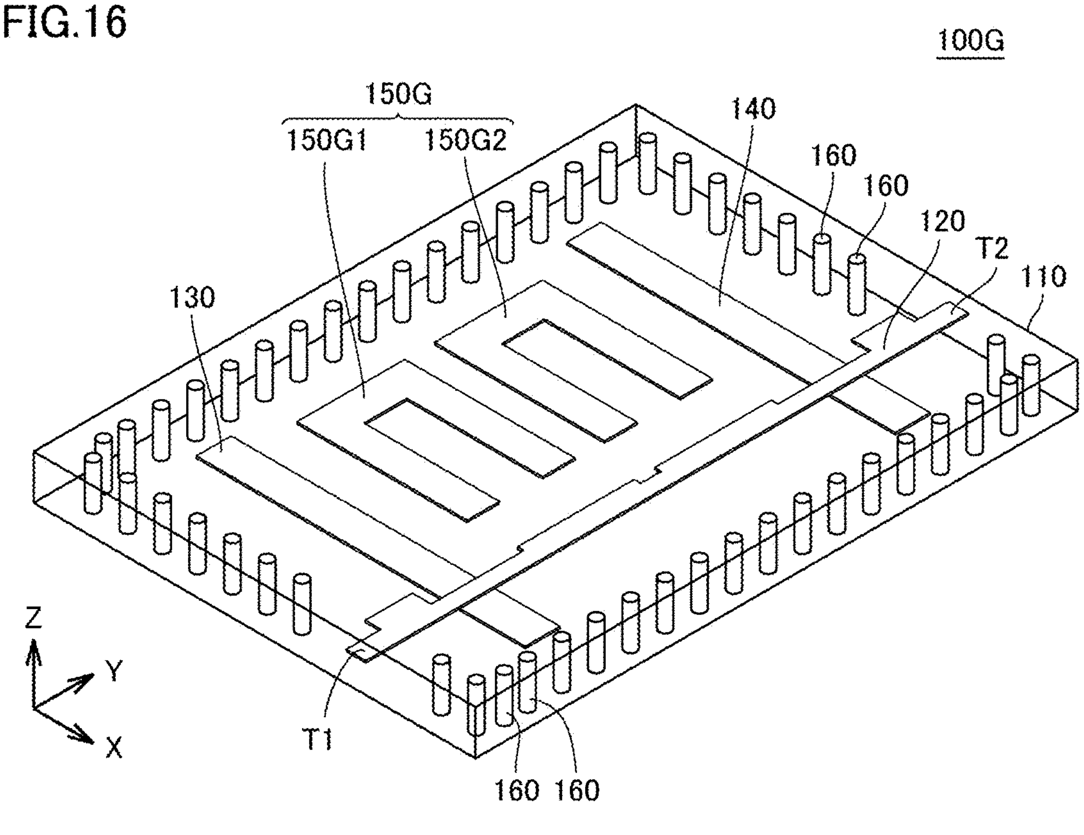
FIG. 16 is a perspective view illustrating the inside of a filter device according to exemplary Embodiment 7.

FIG. 16 is a perspective view illustrating the inside of a filter device 100G according to exemplary Embodiment 7. Referring to FIG. 16, in the filter device 100G, an intermediate resonator 150G includes two resonators 150G1 and 150G2.

As is the case with the resonator 150 in the filter device 100 according to exemplary Embodiment 1, each of the resonators 150G1 and 150G2 is a substantially U-shaped flat electrode and disposed such that both the end portions are directed to the main line 120. In the filter device 100G, the resonator 130, the resonator 150G1, the resonator 150G2, and the resonator 140 are disposed in this order in the positive direction of the Y axis so as to be separated from each other.

Also in such a structure, the resonator 130 on the input end T1 side and the resonator 140 on the output end T2 side are cross coupled to each other with the main line 120 and/or the intermediate resonator 150G interposed therebetween.

When the intermediate resonator includes a plurality of resonators as described above, the coupling amount between the resonators can be slightly weakened, and accordingly, loss in the pass band can be suppressed. However, a substrate area for disposing the plurality of resonators is necessary. Thus, the size of the device may increase. For this reason, the number of resonators in the intermediate resonator is appropriately selected depending on required filter characteristics and an allowable device size.

Figure 17:
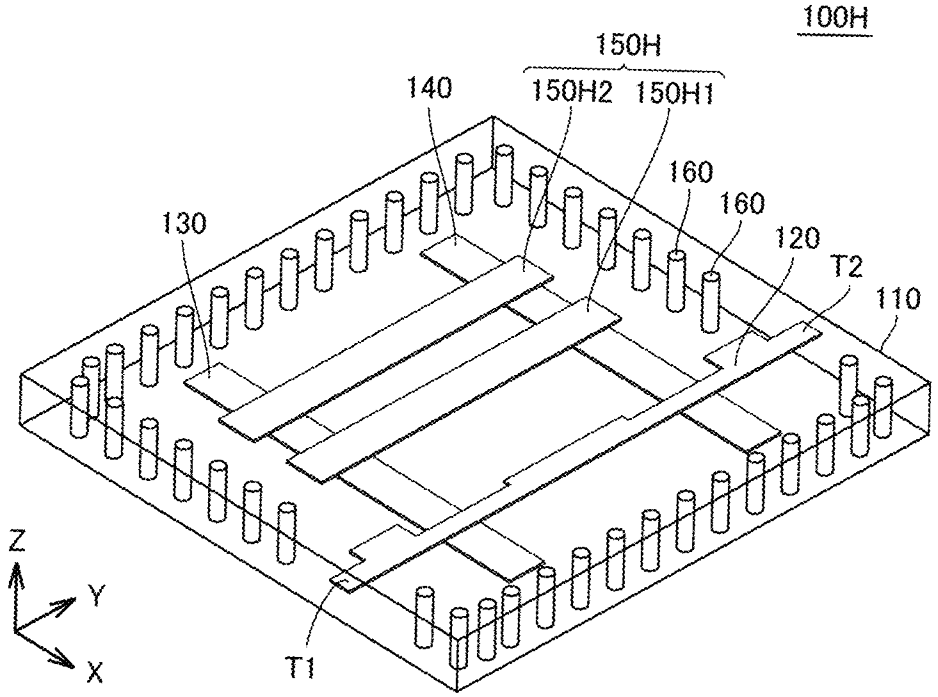
FIG. 17 is a perspective view illustrating the inside of a filter device according to Modification 3.

When the resonator 150B serving as the intermediate resonator intersects the resonators 130 and 140 as is the case with the filter device 100B illustrated in FIG. 7, an intermediate resonator 150H can include two resonators 150H1 and 150H2 extending along the Y-axis direction as is the case with a filter device 100H according to Modification 3 illustrated in FIG. 17. The resonators 150H1 and 150H2 are disposed so as to be separated from each other in the X-axis direction. Each of the resonators 150H1 and 150H2 intersects the resonators 130 and 140.

Also in the filter device 100H according to Modification 3, cross-coupling is generated between the resonators 130 and 140. Thus, the filter characteristics can be improved.

Embodiment (First Item) A filter device according to an exemplary embodiment is applied to a radio-frequency circuit. The filter device includes a dielectric substrate on which a first ground electrode is disposed and a main line which has an input end and an output end. The filter device also includes a first resonator, a second resonator, and an intermediate resonator. The main line is disposed so as to face the first ground electrode and extends in a first direction. The first resonator intersects the main line and extends in a second direction. The second resonator intersects the main line and extends in the second direction in a region further to an output end side than the first resonator. At least part of the intermediate resonator is disposed between the first resonator and the second resonator.

(Second Item) In the filter device according to the first item, each of the first resonator and the second resonator has a first end portion and a second end portion. The main line intersects the first resonator between a center in the second direction and the first end portion in the first resonator, and the main line intersects the second resonator between a center in the second direction and the first end portion in the second resonator.

(Third Item) In the filter device according to the second item, the intermediate resonator is disposed further to a second end portion side than the main line.

(Fourth Item) In the filter device according to the third item, in plan view viewed from a normal direction to the dielectric substrate, the intermediate resonator is disposed in a region surrounded by the main line, the first resonator, and the second resonator.

(Fifth Item) In the filter device according to the third or fourth item, the intermediate resonator has a U shape. End portions of the intermediate resonator are directed to a first end portion side.

(Sixth Item) In the filter device according to the third or fourth item, the intermediate resonator has a U shape. End portions of the intermediate resonator are directed to the second end portion side.

(Seventh Item) In the filter device according to any one of the third to sixth items, the intermediate resonator extends in a different direction from the second direction and is disposed so as to intersect the first resonator and the second resonator.

(Eighth Item) In the filter device according to the seventh item, the intermediate resonator extends in the first direction.

(Ninth Item) In the filter device according to any one of the second to eighth items, the first end portion and the second end portion are open ends in each of the first resonator and the second resonator. When a wavelength of a signal to be stopped by the filter device is λ, a line length of the first resonator, a line length of the second resonator, and a line length of the intermediate resonator are set to λ/2.

(Tenth Item) In the filter device according to any one of the second to eighth items, the first end portion is an open end in each of the first resonator and the second resonator. The second end portion is connected to the first ground electrode in each of the first resonator and the second resonator. When a wavelength of a signal to be stopped by the filter device is λ, a line length of the first resonator and a line length of the second resonator are set to λ/4, and a line length of the intermediate resonator is set to λ/2.

(Eleventh Item) In the filter device according to any one of the second to tenth items, the first end portion of each of the first resonator and the second resonator is bent from the second direction.

(Twelfth Item) In the filter device according to any one of the second to eleventh items, each of the first resonator and the second resonator has a portion having a first line width and a portion having a second line width which is greater than the first line width.

(Thirteenth Item) In the filter device according to the twelfth item, the first end portion and the second end portion of each of the first resonator and the second resonator have the second line width.

(Fourteenth Item) In the filter device according to any one of the first to thirteenth items, in the main line, a portion superposed on neither the first resonator nor the second resonator includes a region having a greater line width than a line width of portions respectively superposed on the first resonator and the second resonator.

(Fifteenth Item) In the filter device according to any one of the first to fourteenth items, when a wavelength of a signal to be stopped by the filter device is λ, a distance between the first resonator and the second resonator is set to be greater than or equal to λ/4 and smaller than or equal to λ/2.

(Sixteenth Item) In the filter device according to any one of the first to fifteenth items, the dielectric substrate further includes a second ground electrode disposed so as to face the first ground electrode. The first resonator, the second resonator, the intermediate resonator, and the main line are disposed between the first ground electrode and the second ground electrode.

(Seventeenth Item) In the filter device according to the sixteenth item, in the dielectric substrate, the first resonator, the second resonator, and the intermediate resonator are disposed at respective positions separated from the first ground electrode and the second ground electrode by an equidistance.

(Eighteenth Item) In the filter device according to any one of the first to seventeenth items, the intermediate resonator is not coupled to the main line.

(Nineteenth Item) In the filter device according to any one of the first to eighteenth items, the first resonator and the second resonator are cross coupled to each other.

(Twentieth Item) In the filter device according to any one of the first to nineteenth items, the intermediate resonator includes a plurality of resonators.

It should be understood that the exemplary embodiments disclosed herein are exemplary in all respects and not limiting. It is intended that the scope of the present disclosure is indicated not by the description of the above-described exemplary embodiments but by the claims and includes all changes within the meaning and scope equivalent to the claims.

REFERENCE SIGNS LIST

100, 100A to 100C, 100D1, 100D2, 100E to 100H filter device
110 dielectric substrate, 111 lower surface, 112 upper surface
120 main line
130, 130D1, 130D2, 130E, 130F, 140, 140D1, 140D2, 140E, 140F, 150, 150A to 150C, 150G1, 150G2, 150H1, 150H2 resonator
150G, 150H intermediate resonator
160 via conductor
E1, E2 end portion
GND1, GND2 ground electrode
T1 input end
T2 output end
V1, V2 via

The invention claimed is:

1. A filter device applied to a radio-frequency circuit, the filter device comprising:
a dielectric substrate on which a first ground electrode is disposed;
a main line which is disposed to face the first ground electrode, which extends in a first direction, and which has an input end and an output end;
a first resonator which intersects the main line and which extends in a second direction;
a second resonator which intersects the main line and extends in the second direction in a region closer to an output end side than the first resonator; and
an intermediate resonator at least part of which is disposed between the first resonator and the second resonator,
wherein the intermediate resonator is not coupled to the main line.

2. The filter device according to claim 1,
wherein each of the first resonator and the second resonator has a first end portion and a second end portion, and
wherein the main line intersects the first resonator between a center in the second direction and the first end portion in the first resonator, and the main line intersects the second resonator between a center in the second direction and the first end portion in the second resonator.

3. The filter device according to claim 2,
wherein the intermediate resonator is disposed closer to a side of the device where the second end portions are located than the main line.

4. The filter device according to claim 3,
wherein, in plan view viewed from a normal direction to the dielectric substrate, the intermediate resonator is disposed in a region surrounded by the main line, the first resonator, and the second resonator.

5. The filter device according to claim 3,
wherein the intermediate resonator has a U shape, and end portions of the intermediate resonator are directed to a first end portion side.

6. The filter device according to claim 3,
wherein the intermediate resonator has a U shape, and end portions of the intermediate resonator are directed to the second end portion side.

7. The filter device according to claim 3,
wherein the intermediate resonator extends in a different direction from the second direction and is disposed to intersect the first resonator and the second resonator.

8. The filter device according to claim 7,
wherein the intermediate resonator extends in the first direction.

9. The filter device according to claim 2,
wherein the first end portion and the second end portion are open ends in each of the first resonator and the second resonator, and
wherein, when a wavelength of a signal to be stopped by the filter device in the dielectric substrate is λ,
a line length of the first resonator, a line length of the second resonator, and a line length of the intermediate resonator are set to λ/2.

10. The filter device according to claim 2,
wherein, the first end portion is an open end in each of the first resonator and the second resonator,
wherein the second end portion is connected to the first ground electrode in each of the first resonator and the second resonator, and
wherein, when a wavelength of a signal to be stopped by the filter device in the dielectric substrate is λ,
a line length of the first resonator and a line length of the second resonator are set to λ/4, and
a line length of the intermediate resonator is set to λ/2.

11. The filter device according to claim 2,
wherein the first end portion of each of the first resonator and the second resonator is bent from the second direction.

12. The filter device according to claim 2,
wherein each of the first resonator and the second resonator has a portion having a first line width and a portion having a second line width which is greater than the first line width.

13. The filter device according to claim 12,
wherein the first end portion and the second end portion of each of the first resonator and the second resonator have the second line width.

14. The filter device according to claim 1,
wherein, in the main line, a portion superposed on neither the first resonator nor the second resonator includes a region having a greater line width than a line width of portions respectively superposed on the first resonator and the second resonator.

15. The filter device according to claim 1,
wherein, when a wavelength of a signal to be stopped by the filter device in the dielectric substrate is λ, a distance between the first resonator and the second resonator is set to be greater than or equal to λ/4 and smaller than or equal to λ/2.

16. The filter device according to claim 1,
wherein the dielectric substrate further includes a second ground electrode disposed to face the first ground electrode, and
wherein the first resonator, the second resonator, the intermediate resonator, and the main line are disposed between the first ground electrode and the second ground electrode.

17. The filter device according to claim 16,
wherein, in the dielectric substrate, the first resonator, the second resonator, and the intermediate resonator are disposed at respective positions separated from the first ground electrode and the second ground electrode by an equidistance.

18. The filter device according to claim 1, wherein the first resonator and the second resonator are cross coupled to each other.

19. The filter device according to claim 1, wherein the intermediate resonator includes a plurality of resonators.

* * * * *